United States Patent [19]

Katagiri et al.

[11] 4,387,625
[45] Jun. 14, 1983

[54] BRAKE BOOSTER

[75] Inventors: Masayoshi Katagiri, Toyota; Osamu Ogura, Nagoya, both of Japan

[73] Assignees: Toyota Jidosha Kogyo Kabushiki Kaisha; Aisin Seiki Kabushiki Kaisha, both of Aichi, Japan

[21] Appl. No.: 223,565

[22] Filed: Jan. 8, 1981

[30] Foreign Application Priority Data

Feb. 9, 1980 [JP] Japan .............................. 55-15002

[51] Int. Cl.³ .............................................. F15B 9/10
[52] U.S. Cl. ............................. 91/369 B; 91/369 A; 74/110
[58] Field of Search ............ 91/369 B, 369 A, 369 R, 91/376 R; 74/110

[56] References Cited

U.S. PATENT DOCUMENTS

| 4,192,220 | 3/1980 | Tateoka | 91/369 B |
| 4,242,943 | 1/1981 | Nakamura et al. | 91/369 B |
| 4,283,911 | 8/1981 | Nakamura et al. | 91/369 B |
| 4,287,811 | 9/1981 | Katagiri et al. | 91/369 B |

Primary Examiner—Paul E. Maslousky
Attorney, Agent, or Firm—Parkhurst & Oliff

[57] ABSTRACT

A brake booster of stroke-enlarging type which includes a power piston disposed in a casing for being actuated by a difference in pressure on opposite sides thereof, a control piston, having therein a control valve for controlling the difference in pressure, being coaxially fitted into a central bore of the power piston relatively movable thereto and a reaction lever, which is abutted at an output portion in the middle thereof by an output member, receiving the output force of the power piston and the output force of the transmission mechanism respectively as an input force at a first input portion and a second input portion thereof located on either side of said output portion, whereby a greater stroke can be obtained at the output member than a stroke applied at an input member.

10 Claims, 9 Drawing Figures

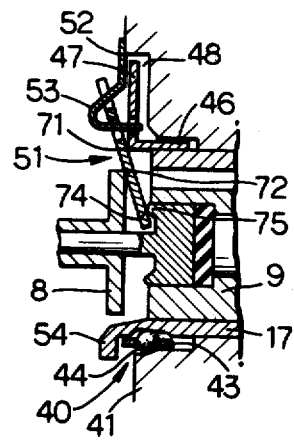
FIG. 5
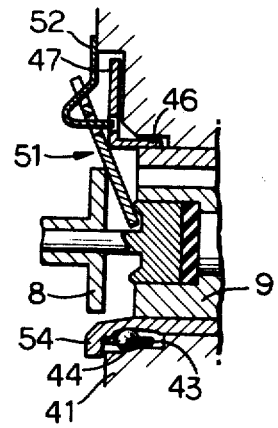
FIG. 6
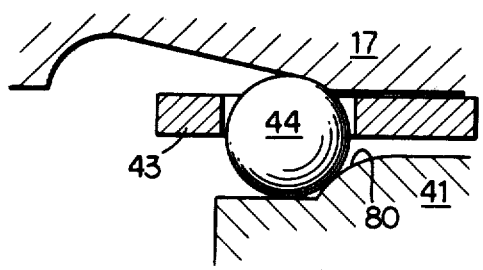
FIG. 7
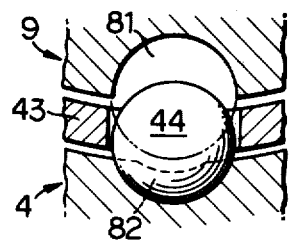
FIG. 8
FIG. 9

BRAKE BOOSTER

FIELD OF THE INVENTION

This invention relates to a brake booster for boosting brake operational force by utilizing gaseous pressure, and more particularly to an improvement of a stroke-enlarging type brake booster.

BACKGROUND OF THE INVENTION

A stroke-enlarging type brake booster mentioned herein means one wherein a power piston, which is placed in a booster casing so as to divide an area within said casing into two chambers and which is moved by the pressure difference between the two chambers, is relatively movable to a control piston. The control piston is provided with a control valve for controlling the abovementioned pressure difference by means of the operation of an input member and a transmission mechanism which transmits an operational force applied to the input member to an output member. The enlargement of the stroke of the output member is obtained by the relative advancing movement of the power piston to the control piston. This stroke-enlarging type brake booster makes it possible to obtain a larger output stroke than the input stroke, while in ordinary brake boosters the output stroke can never be larger than the input stroke.

The stroke-enlarging type brake booster is still disadvantageous when there is a certain limit in an assisting or promoting force, such as a force produced by the difference of pressure on either side of the power piston, so that an attempt at getting a larger output than the critical output corresponding to the critically limited maximum assisting force results in a temporary rapid increasing of the input stroke without being accompanied by an increasing of the braking force.

The inventors of the present invention developed some time ago a brake booster provided with a retraction-preventing mechanism for the power piston, said mechanism being simple in structure and capable of eliminating operation delay. A patent application relating to the mechanism was filed in the U.S. with the Ser. No. 194,404 on Oct. 6, 1980. This retraction-preventing mechanism, which is interposed between the power piston and the control piston, includes balls retained movably in the radial direction by a ball retainer, a ball accommodating recess formed on the external peripheral surface of the control piston, and a ball driving surface and a ball locking surface formed on the internal peripheral surface of the power piston. The bottom surface of the ball accommodating recess is formed so as to be deeper or progressively approaching in the forwardly oriented direction the axis of the control piston, so that the ball may be pushed into a deeper portion of the ball accommodating recess while the power piston is advancing by means of the ball driving surface. At the forwardmost position of the power piston the ball is prevented from moving in a departing direction from the axis of the control piston by the ball locking surface, so that the reactionary force applied to the ball retainer from the output member by way of a reaction lever is exclusively transmitted from the bottom surface of the ball accommodating recess to the control piston via the thus locked ball. Because the above-mentioned ball locking surface is formed in parailel with the axis of the control piston, the reactionary force can not affect the power piston when the power piston is in an advanced position.

The above-mentioned retraction-preventing mechanism is advantageous only in the aspect of preventing the retraction of the power piston after reaching the maximum or critical point of the assisting force. A remaining problem is that some extent of clearance between the ball and the bottom surface of the ball accommodating recess is inevitable, excepting a case wherein the finish precision of those members is extremely high, because of the above stated shape of the ball locking surface. So the clearance left between the bottom surface of the ball accommodating recess and the ball obliges the ball retainer to be retracted by an amount corresponding to this clearance before the ball fixedly engages with the bottom surface of the ball accommodating recess. The actual retracting amount of the ball retainer in this instance is significantly large due to a fairly gentle slope of the bottom surface. The retraction of the ball retainer inevitably causes a corresponding loss stroke or idle stroke of the input member, thereby deteriorating the smooth operational feeling of the brake operating members such as a brake pedal, etc.

Another problem of the retraction-preventing mechanism is that the ball locking surface formed parallelly to the axis of the control piston makes the the control piston incapable of regulating the advancement of the power piston after locking of the ball, consequently a proper stopper is required for that purpose. The impact taking place when the power piston abuts the stopper is transmitted to the brake pedal, further deteriorating the brake feeling.

SUMMARY OF THE INVENTION

This invention was made from such a background. It is therefore a primary object of this invention to provide a brake booster capable of eliminating the above-mentioned idle stroke of the input member and assuring a comfortable brake feeling, by means of preventing the retraction of the power piston after the reaching of the critical assisting force. The essential feature of the present invention utilized for attaining the object is to make the backwardly biased portion of the ball driving surface a slope gentler than the remaining portion thereof. By making such a structure, elimination of the proper stopper for regulating the end of advancing movement of the power piston can be provided, since the problematic idle stroke of the input member which may occur after the reaching of the critical assisting force can thus be prevented. Consequently, the shock or impact created when the power piston abuts the stopper is prevented from being transmitted to the pedal, and a comfortable feeling on inputting members of the brake can be maintained.

BRIEF DESCRIPTION OF THE DRAWINGS

FIGS. 4–7 are respectively an explanatory view of the embodiment shown in FIGS. 1–3 for explaining the operation of the same;

FIG. 8 is an enlarged sectional view of an essential part of another embodiment of this invention; and FIG. 9 is an enlarged sectional view of an essential part of another embodiment of this invention.

DETAILED DESCRIPTION OF THE PREFERRED EMBODIMENTS

Detailed description on the preferred embodiments of this invention will be made hereinafter with reference to the appended drawings.

Figure 1:
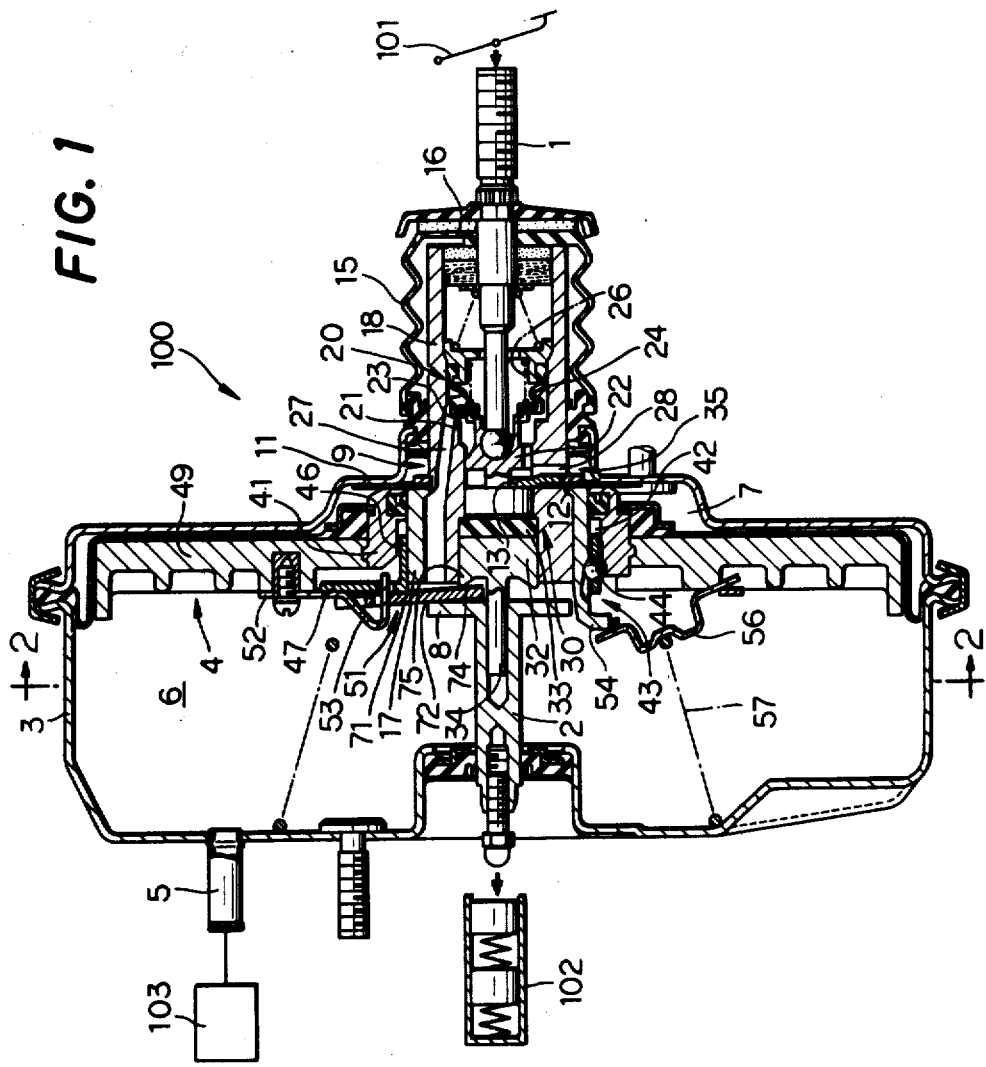
FIG. 1 is a sectional view, in elevation, of an embodiment of a brake booster in accordance with this invention.

A booster 100 shown in FIG. 1 functions to boost an input force applied to an operating rod 1 thru an input member, before transmitting the same from a push rod 2 thru an output member, to a master cylinder 102.

The booster 100 is provided with an air tight casing 3, whose internal area is divided into two chambers by a power piston 4 of diaphragm type. The power piston 4 includes a main body 49 and an annular member 41 disposed inside of the main body 49. One of the two chambers divided by the power piston 4 constitutes a constant pressure chamber 6 which is under negative pressure, being connected to a vacuum source 103 such as an intake manifold of an engine or a vacuum pump by way of a pipe joint 5. The other chamber is a variable pressure chamber 7 which is variable in pressure by being selectively communicated to the constant pressure chamber 6 or the ambient atmosphere by a later described control valve.

In the central part of the power piston 4 a control piston 9 having a control valve 20 and a transmission mechanism 30 is slidably fitted. The control piston 9 consists of a body 18 and a cylindrical member 17 fitted on the outside of the control piston 9. The control valve 20 is composed of a first valve seat 21 formed on the control piston 9, a second valve seat 23 formed on a valve plunger 22 slidably fitted in the control piston 9, and a valve element 24 composed of elastic material disposed commonly to the two valve seats 21, 23. The valve element 24 is biased to both valve seats 21, 23 by the action of a compression spring 26. In the control piston 9 a respective air inlet passage 27 and 28 communicated to the constant pressure chamber 6 and the variable pressure chamber 7 are formed. In a groove formed in communication with the air inlet passage 28 and wider than that, a stopper 13 is inserted to restrict the advancing end and the retracting end of the valve plunger 22. An E shape ring 12 prevents removing of the stopper 13 out of the inserted place. The E shape ring 12 simultaneously functions to lock a stopper plate 11 which is abuttable on the rear wall of the casing 3 for restricting the retracting end of the control piston 9. A projecting portion of the control piston 9 from the casing 3 is completely covered by a boot 15, whose end portion is provided with an air inlet port 16.

On the other hand, the transmission mechanism 30 includes the valve plunger 22 fixed on the tip of the operating rod, a large plunger 32 fitted into the control piston 9, and a rubber reaction disc 33 interposed between the valve plunger 22 and the large plunger 32. The reaction disc 33 functions, while allowing a slight relative movement of the valve plunger 22 and the control piston 9, to transmit the resultant force applied from both the valve plunger 22 and the control piston 9 to the large plunger 32. The large plunger 32 is provided with a rod portion 34 projecting from the central part thereof for retaining the rear end of the push rod 2.

Figure 2:
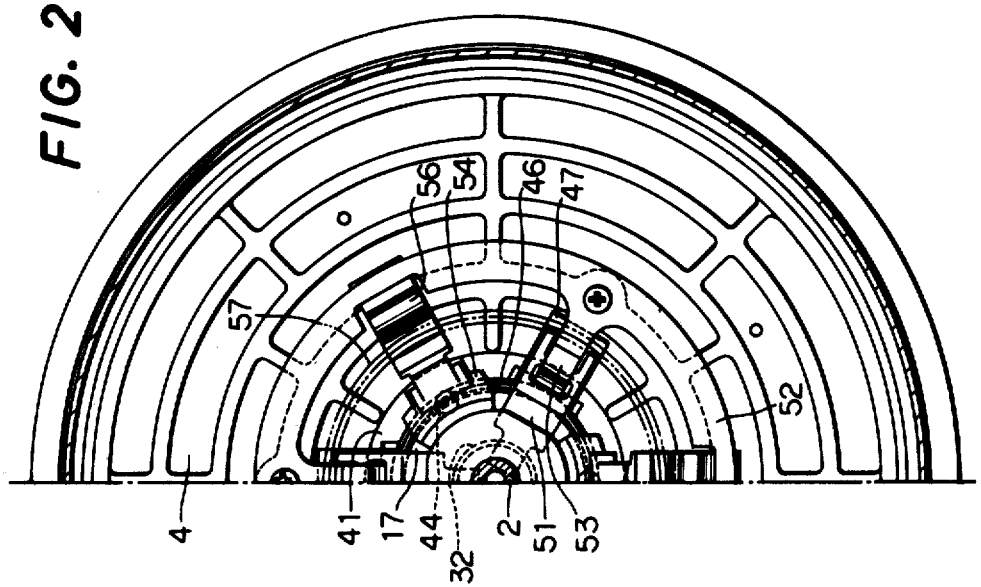
FIG. 2 is a cross sectional view of the embodiment shown in FIG. 1 taken along the section line 2—2 (left half is omitted)

As shown in FIG. 1 and in FIG. 2 (wherein right half only is illustrated because the left half is entirely symmetrical to the former), a circumferential clearance or gap 42 is left between the power piston 4 and the control piston 9 at a counter bore portion (a large internal diametered portion) formed on the forward side of the power piston 4 wherein a ball retainer 43 for loosely retaining a plurality of balls 44, in this embodiment 3 in number, is accommodated.

Figure 3:
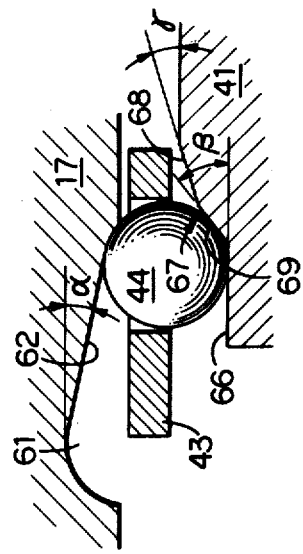
FIG. 3 is an enlargement of an essential part in FIG. 1.

More particularly, as illustrated in FIG. 3, on the external peripheral surface of the cylindrical member 17 a ball accommodating recess 61 of annular shape, which becomes progressively deeper along the forward direction (left side in FIG. 3), as it approaches the axis of the control piston 9, is formed. And a bottom surface 62 of the ball accommodating recess 61 is so tapered as to gradually diminish the diameter thereof along the forward direction. The angle $\alpha$ which is formed by the bottom surface 62 against the axis of the control piston 9 is 7° in this embodiment. The balls 44 are accommodated in the ball accommodating recess 61 so as to partially protrude from the external peripheral surface of the control piston 9.

The annular member 41 is, at the forward portion of the counter bore portion, enlarged a little more in its internal diameter. Consequently, a parallel surface 66 at the forwardmost portion of the annular member 41 and a sloped ball driving surface 67 as a continuation thereto are formed. The parallel portion 66 is formed in parallel to the axis of the power piston 4. The ball driving surface 67 consists of two tapered surfaces, an acute or steep slope portion 69 and a gentle slope portion 68 situated behind the the steep slope portion 69. The tapered surfaces of the steep slope portion 69 and the gentle slope portion 68 are formed so as to become progressively enlarged along the forward direction in the internal diameter thereof. The ball driving surface is therefore inclined so as to depart from the axis of the control piston 9 along the forward direction. The angles $\beta$ and $\gamma$ formed respectively by the acute slope portion 69 and the gentle slope portion 68 against the axis of the power piston 4, are in this embodiment 45° and 8° respectively.

The ball retainer 43 is composed, as clearly shown in FIG. 2, of a cylindrical portion 46 of thin wall and of three abutting flanges 47 formed outwardly at a right angle. The cylindrical portion is provided with three ball retaining bores at an equal circumferential distance for retaining the balls 44 movably in the radial direction.

Three reaction levers 51 are interposed respectively between three abutting flanges 47 and the large plunger 32, and a reaction plate 8 on the rear end of the push rod 2. A first input portion 71 of each reaction lever 51 is in contact with the abutting flange 47 and a second input portion 74 of each reaction lever 51 is in contact with an output portion 75 of the large plunger 32. An output portion located between the two input portions 71, 74 is in contact with the reaction plate 8. On the power piston 4 a lever retainer 52, being generally of annular shape and being provided with three tongues 53 extending toward the axis of the power piston 4, is secured. The tongues 53 are respectively bent so as to form two sides of a triangle from the root to the tip thereof, and are engaged at the root portion of the triangle with a notch formed at one end portion of each reaction lever 51, and are fitted at the tip portion of the triangle into an opening formed in the reaction lever 51 for retaining the reaction lever 51. The tongues 53 are also abuttable on the abutting flanges 47 of the ball retainer 43. The cylindrical member 17 is provided on the forward end thereof with three outward flanges 54. A compression coil spring 57 is spanned between the middle portion of each of three spring receivers 56 and the forward portion of casing 3 at a position opposite to the spring receivers 56.

The operation mode of this embodiment will be explained hereunder. In a state of nondepression of a brake pedal 101, the second valve seat 23 is in contact with the valve element 24 and the first valve seat 21 is not in contact with the valve element 24. So the variable pressure chamber 7 is in communication with the constant pressure chamber 6 so as to maintain both chambers 6, 7 at an equal negative pressure, so that there is no pressure difference between either side of the power piston 4. Both the power piston 4 and the control piston 9 are under the biasing force of the spring 57 via the spring receiver 56, thereby rendering the stopper plate 11 is an abutting position on the casing 3. The control piston 9 is kept in a retracted position by the abutment of the stopper plate 11 on the casing 3 and the power piston 4 is kept in a retracted position by the abutment on the stopper plate 11 as shown in FIG. 1.

A slight depression of the brake pedal 101 in this state, with a slight forward advancing of the operating rod 1 (leftward movement in FIG. 1), makes the first valve seat 21 contact the valve element 24 by removing the second valve seat 23 therefrom. The variable pressure chamber 7 is consequently separated from the constant pressure chamber 6 so as be in communication with the ambient atmosphere. Between the constant pressure chamber 6 and the variable pressure chamber 7, where the air comes in from outside, a pressure difference is naturally created so as to relatively move the power piston 4 toward the control piston 9.

While the power piston 4 is advancing, a force is applied to the ball 44 via the ball driving surface 67 of the annular member 41. In the initial stage the steep or acute slope portion 69 of the ball driving surface 67 moves the ball 44 forward and concurrently toward the axis of the control piston 9, upward in FIG. 3. As the ball 44 gradually contacts with a deeper portion of the ball accommodating recess 61, a part of the acute slope portion 69 near the gentle slope portion 68 begins to contact with the ball 44. The advancing of the ball retainer 43 causes a force to be applied on the first input portion 71 of the reaction lever 51 so as to cause the reaction lever 51 to be rotated by assuming as a fulcrum the output portion 75 of the plunger 32, as shown in FIG. 5, which the second input portion 74 of the reaction lever 51 is in contact with, which results in imparting a driving force to the push rod 2 from the output portion 72 of the reaction lever 51 via the reaction plate 8. Consequently, a much larger output stroke is obtained than the input stroke applied. Due to the output stroke, braking fluid in the master cylinder 102 is supplied to the not-shown braking system, with a result of compensating the consumed fluid amount caused by the extinction of the brake clearance and the initial deformation of the piston cup and others.

Figure 4:
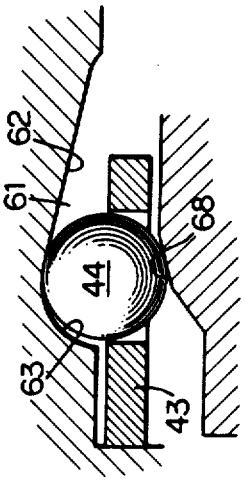

At the stage of braking effect appearing after the extinction of the brake clearance, the ball driving surface 67 begins to contact with the ball 44 at the gentle slope portion 68 thereof, as shown in FIG. 4. Immediately thereafter the forward end of the ball retainer 43 abuts the flange 54 of the cylindrical member 17 so as to be blocked from advancing. In this stage the ball 44 is rendered unable to move in any direction by means of being placed in forced contact from three directions, that is, being urged against the forward portion of the bottom surface 62 of the ball accommodating recess 61 by the ball driving surface 67 while being urged against the inside surface of the ball retaining hole of the ball retainer 43 which has been blocked from advancing by the flange 54.

As the power piston 4 is blocked from advancing by the ball retainer 43 through the abutment between the gentle slope portion 68 thereof and the ball 44, it does not need a proper stopper. In addition, the mildness of the gentle slope portion 68 is helpful in preventing a sudden stop of the power piston 4, thereby preventing a shock generated by the stoppage from coming to the brake pedal.

As can be understood from the above explanation, the ball accommodating recess 61 has only to be provided with the inclined bottom surface 62, and a curved surface 63 on the forward side may be eliminated. But if it is maintained as it is, the flange 54 functioning as the stopper can be eliminated instead.

When the ball retainer 43 has become relatively nonmovable to the control piston 9 and the gentle slope portion 68 of the power piston 4 has come to abut on the ball 44 retained by the ball retainer 43, the operating rod 1 advances the push rod 2 while the operating rod 1 and the power piston 4 share the load at the ratio determined by both the reaction lever 51 and the reaction disc 33.

If the brake pedal 101 is depressed even further after the limit of the pressure difference on either side of the power piston has been reached, the second input portion 74 of the reaction lever 51 receives a major force from the output portion 75 of the large plunger 32 to cause the reaction lever 51 to be rotated, assuming the reaction plate 8 as a fulcrum on which the output portion 72 of the reaction lever 51 is abutted, so as to push the ball retainer 43 backwards. At this stage the ball retainer 43 makes no retraction, because the portion of the ball backwardly biased from the ball center is in contact with the bottom surface 62 of the ball accommodating recess 61 and the gentle slope portion 68, the inter-distance therebetween being gradually diminished. This arrangement, frees the brake pedal from being affected by an idle stroke.

The above-mentioned backward pushing force F on the ball retainer 43 is transmitted to both the control piston 9 and the power piston 4. In other words, the sum of the horizontal components $H_1$ and $H_2$ of the forces $F_1$ and $F_2$ acting on the bottom surface 62 and the gentle slope portion 68 becomes equivalent with the value of the force F. The power piston 4 can never be pushed backward in this instance, because the magnitude of the angle $\gamma$ is determined so as to make the component $H_2$ smaller than the critical value of the assisting force due to the pressure difference, irrespective of the fact $\alpha < \gamma$ and $H_1 < H_2$.

At this stage the valve plunger 22 is abutted on the stopper 13 so as to be restricted of its forward movement. After this abutment the operating rod 1, the valve plunger 22, the control piston 9, the larger plunger 32, the reaction disc 33, the ball retainer 43, and the reaction lever 51 are all combined into an integral body to advance the push rod 2 forward via the reaction plate 8 as a mass of the integrated body. The output stroke is increased at this stage in the same amount as the input stroke. Since the assisting force to the power piston 4 has already reached a maximum at this point, the output of the booster can never be increased beyond the increase of the brake operational force.

When the depression of the brake pedal 101 is released, the valve element 24 comes into contact with the second valve seat 23 after leaving the first valve seat 21, thereby rendering the variable pressure chamber 7 closely sealed by means of its separation from the ambient atmosphere and placing the variable pressure chamber 7 in communication with the constant pressure chamber 6 instead (see FIG. 1). No assisting force is applied in this stage on the power piston 4, so the power piston is retracted under the biasing force from the spring 57 which comes by way of the spring receiver 56. By means of this retraction of the power piston 4, the locking of the balls 44 by the ball driving surface 67 is released so as to return the balls 44 to the state shown with a solid line in FIG. 3, along the reverse process to that seen when it was locked. If the ball 44 is not smoothly returned for some reason, it will be forcibly returned by the abutment of the tongues 53 of the lever retainer 52 on the flanges 47 of the ball retainer 43.

It goes without saying that the above description is only for exemplifying this invention by taking up an embodiment and various alterations or modifications can easily be made by those skilled in the art within the scope of the claims.

For example, the bottom surface 62 of the ball accommodating recess 61 can be determined in the range of $0° < \alpha \leq 15°$, the acute slope portion 69 can be determined in the range of $20° \leq \beta \leq 75°$, and the gentle slope portion 68 may also be determined in the range of $0° < \gamma \leq 30°$. The bottom surface 62 may be inclined at the forwardly biased portion thereof to a greater extent than at the backwardly biased portion thereof. On the other hand, the inclination angle of the backwardly biased portion of the ball driving surface 67 has only to be gentler than the remaining portion thereof. Futhermore, it is even possible to make the whole of the ball driving surface 67 a continuous curved surface 80, as shown in FIG. 8, by removing the angular portion between the acute slope portion 69 and the gentle slope portion 68.

The arrangement of the ball 44 disposed in a bridging manner as shown in FIG. 9, so as to bridge the control piston 9 and the power piston 4 by being accommodated in either of the first ball groove 81 formed in the control piston 9 and the second ball groove 82 formed in the power piston 4, is effective in preventing a relative rotation of the two pistons (4, 9). It is a matter of course even in this case that the first ball groove 81 has to be formed gradually deeper toward the forward direction and the second ball groove 82 has to be provided, similarly to the previous embodiment, with the acute slope portion and the gentle slope portion.

As a medium for transmitting a resultant force of the control piston 9 and the valve plunger 22 to the large plunger 32, while allowing relative movement between the two, the reaction disc 33 is preferable but it can be replaced by a lever or the like. In fact, complete elimination of the reaction disc 33 or a similar component is possible, as disclosed in U.S. Pat. No. 4,100,839.

As an assisting force given to the power piston 4, the pressure difference created between the pressure of the ambient atmosphere and a positive pressure is allowed, and that created between a chamber constantly set at the ambient atmospheric pressure and another chamber which is selectively set at the ambient atmospheric pressure or a negative pressure is also allowed.

The present invention is also applicable to a stroke-enlarging type brake booster, wherein a compression spring is spanned between the power piston and the control piston, which is disclosed in TOKU-KAI-SHO-54(1979)-99875 (Japanese Patent Application laid open to public).

What is claimed is:

1. A brake booster comprising:
   a casing;
   a power piston disposed in said casing to divide an area within said casing into two chambers for being moved in accordance with the difference of pressure in the two chambers;
   a control piston, having therein a control valve for controlling the difference of pressure in said two chambers and a transmission mechanism for transmitting an input force of an input member, being coaxially fitted into a central bore of said power piston relatively movable thereto;
   at least one ball accommodating recess formed on the external peripheral surface of said control piston, whose bottom surface includes a portion progressively deepened along the forward direction;
   at least one ball movably accommodated in said ball accommodating recess so as to partly protrude from the external peripheral surface of said control piston;
   at least one ball driving surface formed on the internal peripheral surface of said power piston for advancing said ball together with said power piston when the same is advanced;
   said ball driving surface including an acute slope portion and a gentle slope portion, said gentle slope portion being located at the rear side of said acute slope portion and being formed to contact with said ball which has been accommodated in a deep portion of said ball accommodating recess when said power piston has relatively been advanced to said control piston as far as the forwardmost position;
   a ball retainer movably retaining said ball in the radial direction; and
   at least one reaction lever abutted at an output portion in the middle thereof by an output member and at a first input portion on a first side thereof and a second input portion on a second side thereof by said ball retainer and said transmission mechanism respectively.

2. A brake booster claimed in claim 1, wherein said acute slope portion and said gentle slope portion are tapered internal surfaces formed continuously to each other, with a progressively enlarging internal diameter along the forward direction, in the internal periphery of said power piston.

3. A brake booster claimed in claim 1, wherein said ball accommodating recess is a first groove extending in the axial direction with an arcuate cross-sectional shape identical in the radius thereof to that of said ball, and said acute slope portion and said gentle slope portion are respectively formed as a part of a second groove extending in the axial direction with an arcuate cross-sectional shape identical in the radius thereof to that of said ball.

4. A brake booster claimed in claim 1, wherein said ball driving surface is a continuously curved surface having no angular portion between said acute slope portion and said gentle slope portion.

5. A brake booster claimed in claim 1, wherein the angle α formed by the bottom surface of said ball accommodating recess, the angle β formed by said acute slope portion, and the angle γ formed by said gentle slope portion against the axis of said power piston are respectively determined in the range of $0° < \alpha \leq 15°$, $20° \leq \beta \leq 75°$ and $0° < \gamma \leq 30°$.

6. A brake booster claimed in claim 1 wherein the central bore of said power piston is a stepped bore which has a counter bore portion on the forward side of said power piston, and in said counter bore portion said ball retainer is accommodated.

7. A brake booster claimed in claim 1, wherein said ball accommodating recess is an annular groove, whose bottom surface forms a tapered one with a progressively diminishing diameter in the forward direction.

8. A brake booster claimed in claim 1, wherein said ball is installed plural in number with an equal circumferential distance.

9. A brake booster claimed in claim 1, wherein said ball retainer is a cylindrical member provided with a ball retaining through-bore in the radial direction thereof.

10. A brake booster claimed in claim 1, wherein said control piston is provided with a stopper for blocking the advancing of said ball retainer at the forwadmost position thereof.

* * * * *